United States Patent [19]
Wilhelmsen

[11] 4,094,562
[45] June 13, 1978

[54] TRUCK BODY DOOR ASSEMBLY

[76] Inventor: Irven R. Wilhelmsen, 6359 Dominica St., Cypress, Calif. 90630

[21] Appl. No.: 617,314

[22] Filed: Sep. 29, 1975

[51] Int. Cl.² .................................................. F02N 11/06
[52] U.S. Cl. .................................. 312/290; 312/237; 296/57 R; 292/40; 292/DIG. 43
[58] Field of Search ............. 312/290, 237; 296/57 R; 292/7, 40, DIG. 65, DIG. 43

[56] References Cited

U.S. PATENT DOCUMENTS

| | | | |
|---|---|---|---|
| 426,794 | 4/1890 | Foote | 292/40 |
| 1,083,304 | 1/1914 | Straubel | 312/290 |
| 2,043,787 | 6/1936 | Wild | 292/DIG. 65 |
| 2,286,427 | 6/1942 | Levensten | 312/290 |
| 2,564,600 | 8/1951 | Hummer | 292/DIG. 65 |
| 2,832,620 | 4/1958 | Orlow | 292/DIG. 43 |
| 3,398,985 | 8/1968 | Rhoades | 296/57 R |

*Primary Examiner*—Paul R. Gilliam
*Assistant Examiner*—Victor N. Sakran
*Attorney, Agent, or Firm*—Dana E. Keech

[57] ABSTRACT

A bottom hinged side door of a truck body which is associated with an automatically locked-closed top cover of a tool tray disposed directly above said door, the locking of said cover being relaxed upon the opening of said door.

2 Claims, 5 Drawing Figures

U.S. Patent   June 13, 1978   Sheet 1 of 2   4,094,562
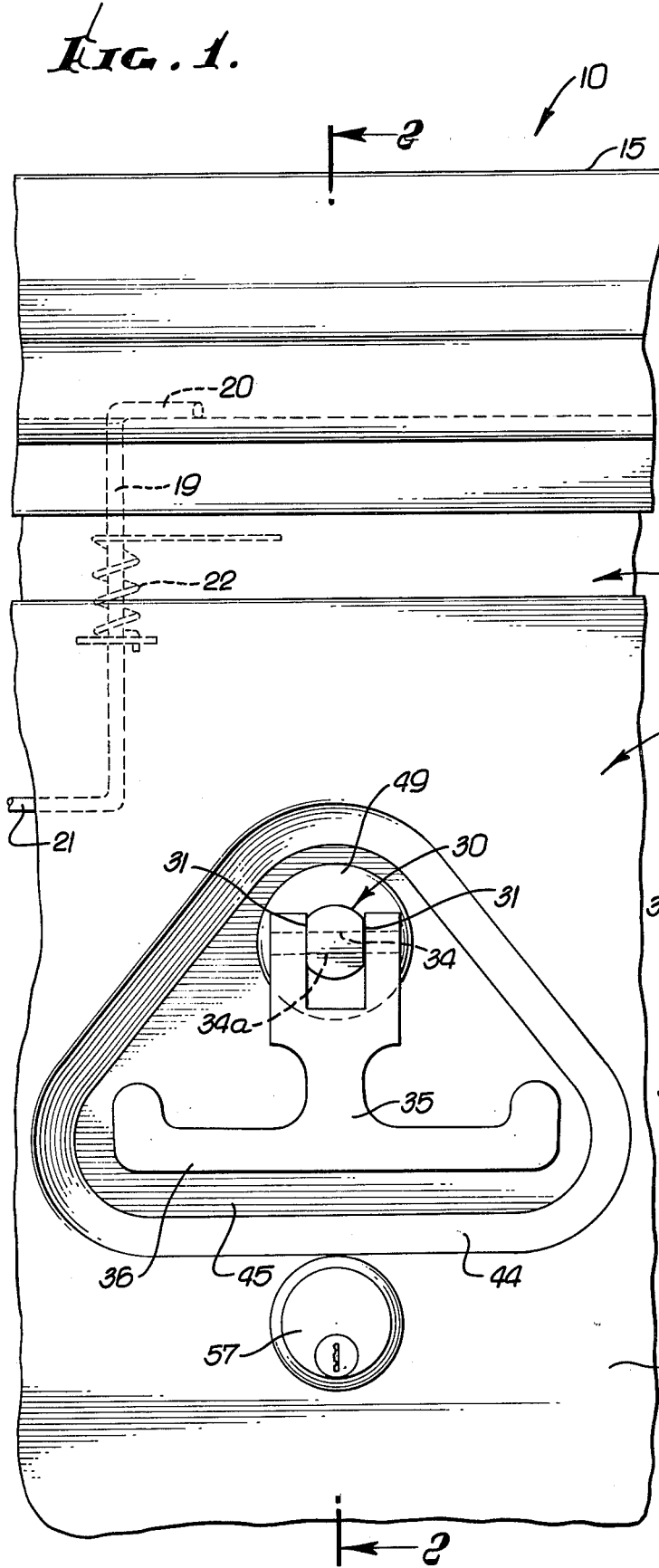
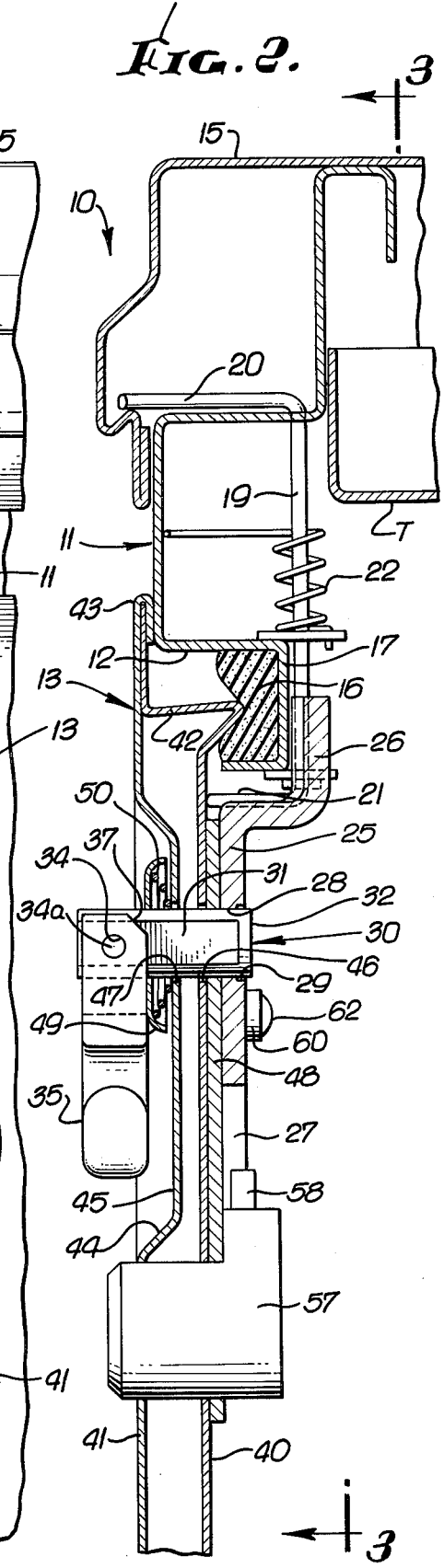

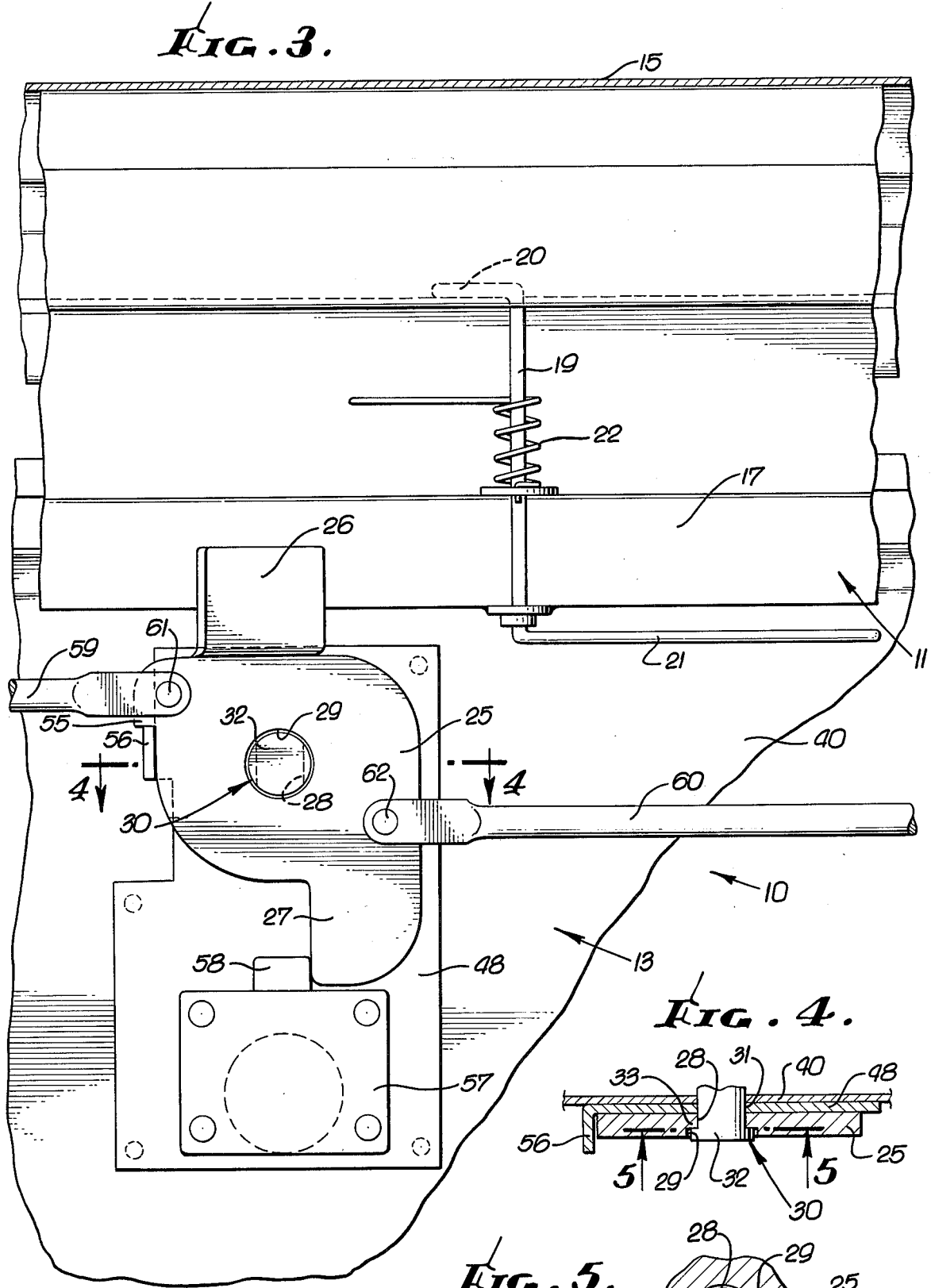

TRUCK BODY DOOR ASSEMBLY

SUMMARY OF THE INVENTION

It is a primary object of the present invention to provide a simple rugged truck body door assembly embodying means for locking a downward opening side door of a truck body and simultaneously locking closed a tool tray cover disposed directly above said door when said door is closed and releasing said tool tray cover when said door is opened outwardly.

BRIEF DESCRIPTION OF THE DRAWINGS

FIG. 1 is a fragmentary front elevational view of a preferred embodiment of the invention.

FIG. 2 is a vertical sectional view taken on the line 2—2 of FIG. 1.

FIG. 3 is a vertical sectional view taken on the line 3—3 of FIG. 2.

FIG. 4 is a detailed sectional view taken on the line 4—4 of FIG. 3.

FIG. 5 is a detailed sectional view taken on the line 5—5 of FIG. 4.

DETAILED DESCRIPTION OF THE PREFERRED EMBODIMENT

The door assembly 10 of the invention includes a truck body side wall frame 11 having a rectangular opening 12 in which a sheet metal door 13 is hingedly mounted on a hinge (not shown) along its lower edge. The upper portion of the frame 11 provides a shallow tray T along its entire length and has pivotally mounted on said frame a cover 15 which is adapted to fold downwardly to cover said tray.

Formed on the frame 11 in the inner periphery of the opening 12 is a rectangular foam rubber moisture seal 16 which has a sheet metal casing 17. Pivotally mounted vertically in the frame 11 is a cover locking rod 19 having a cover locking arm 20 bent horizontally from its upper end and having an actuating arm 21 bent from its lower end. The rod 19 is rotatably spring-biased by a spring 22 to withdraw arm 20 from locking relation with the cover 15. Whenever the door 13 is opened, the locking rod 19 thus releases cover 15 so that it may be readily opened manually. When the door 13 is closed however, as shown in the enclosed sketches, this door engages the operating arm 21 and swings the upper arm 20 into locking relation with the cover 15 as clearly shown in FIG. 2.

The door assembly 10 also includes a manually operative but key lockable latch 25 which carries peripherally a cam latch lug 26 and a key locking lug 27 and has centrally therein a flat sided hole 28 with a circular counter bore 29 formed in its outer end. A latch mounting pin 30 having flattened sides 31 and a circular head 32 snugly fits the flat sided hole 28 so that the head 32 of the pin comes to rest against the shoulders 33 formed in the latch 25 by the flat sided portions of the flat sided hole 28. This relationship between the pin 30 and the latch 25 retains the latch and pin in assembled relation and locks these two elements against relative rotation and permits rotation of the latch 25 through the pin. The opposite end of pin 30 is provided with a hole 34 to receive a pin 34a for swingably securing thereto a bifurcated handle 35 having a T-head grip 36. The handel has a bevelled surface 37, the purpose of which will be explained later. The door 13 comprises inner and outer sheet metal plates 40 and 41, the plate 40 being peripherally deformed to provide an inwardly projecting peripheral seal 42 which engages the sealing cushion 16 when the door 13 is closed, the extreme outer edge of the plate 40 then engaging in an interlocking seal 43 with the plate 41 which engages the frame 11 immediately outwardly from the rectangular door opening 12.

To accommodate the handle 35, the outer door plate 41 is die formed inwardly to provide a triangular recess 44 having a flat door 45 which is spaced from the inner door plate 40 approximately ⅛ inch. The plate 40 and the floor 45 have aligned holes 46 and 47 respectively through which the pin 30 passes in assembling the latch 25 on the door. A heavy lock mount plate 48 is also apertured to receive the pin 30 and spaces the latch 25 from the plate 40 to which plate 48 is spot welded.

A relatively thin cup-shaped washer 49 confining a spiral coil spring 50 is also penetrated by the pin 30 and lies between the floor 45 of the depression 44 and the handle 35. The tension of spring 50 is thus applied to the handle so that it may be held either in closed position as shown in the sketches or in open position in which it is swung outwardly so as to be used in rotating the latch 25 in order to latch the door 13 in closed position as shown in the sketches or to unlatch this door to permit the same to be opened. The beveled surface 37 minimized the effort required in rocking handle 35 between folded and extended position.

The cam latch lug 26 is offset inwardly from the latch 25 and is also bent to lie in a clockwise inclined plane so that when rotated clockwise (viewed from outside the door 13) lug 26 engages casing 17 with a camming action which tightens the closing of door 13 as lug 26 is turned into full door closing position, as shown in FIGS. 2 and 3.

Latch 25 is halted in full door closing position by a shoulder 55, provided on said latch, engaging a stop 56 outbent from plate 48. A lock 57 mounted on plate 48, when now key actuated, extends a lock bar 58 behind lock lug 27, thereby key locking door 13 shut.

The locking of door 13 is further assisted by door end locking rods 59 and 60 which are pivoted at 61 and 62 on latch 25 and suitably guided horizontally on door 13, so that outer ends of said rods overlap end portions of casing 17 when said door is locked shut as above described.

I claim:

1. In combination:
   a door assembly including a wall frame having a rectangular opening and a door supported on said frame to swing downward about the lower edge of said opening;
   a tool tray extending horizontally inwardly from the upper edge of said wall frame;
   a cover for said tray;
   key-lockable manually operable latch means mounted in said door for holding said door in opening covering position, said door, when unlocked, being swingable downwardly and outwardly from closing relation with said opening; and
   means automatically responsive to the closing of said door to lock said cover in closing relation with said tool tray, and automatically responsive to the opening of said door to release said cover permitting access simultaneously to said tray and to said door opening.

2. A combination as recited in claim 1 wherein said cover locking means includes
   a rod vertically and rotatably mounted on said wall frame and having a cover locking lug extending at a right angle horizontally from its upper end and an actuating lug extending at a right angle horizontally from its lower end; and
   spring means biasing said rod towards cover unlocking position.

* * * * *